United States Patent [19]
Baugher et al.

[11] Patent Number: 5,701,465
[45] Date of Patent: Dec. 23, 1997

[54] METHOD AND APPARATUS FOR RESERVING SYSTEM RESOURCES TO ASSURE QUALITY OF SERVICE

[75] Inventors: Mark John Baugher; Philip Yen-Tang Chang, both of Austin; Gregory Lynn Morris, Round Rock; Alan Palmer Stephens, Austin, all of Tex.

[73] Assignee: International Business Machines Corporation, Armonk, N.Y.

[21] Appl. No.: 674,074

[22] Filed: Jul. 1, 1996

Related U.S. Application Data

[63] Continuation of Ser. No. 84,053, Jun. 29, 1993, Pat. No. 5,581,703.
[51] Int. Cl.$^6$ .............................. G06F 17/30; G06F 13/14
[52] U.S. Cl. .................. 395/610; 395/621; 395/616; 395/200.06; 370/231; 370/468
[58] Field of Search .......................... 395/600, 200.06, 395/610, 616, 621; 370/84, 85.5, 231, 468

[56] References Cited

U.S. PATENT DOCUMENTS

| | | | |
|---|---|---|---|
| 4,331,834 | 5/1982 | Ganz et al. . | |
| 4,466,058 | 8/1984 | Girard et al. . | |
| 4,538,147 | 8/1985 | Grow | 340/825.05 |
| 4,539,679 | 9/1985 | Bux et al. . | |
| 4,654,867 | 3/1987 | Labedz et al. . | |
| 4,870,641 | 9/1989 | Pattavina . | |
| 4,991,079 | 2/1991 | Dann . | |
| 5,054,109 | 10/1991 | Blackburn . | |
| 5,136,581 | 8/1992 | Muehrcke . | |
| 5,187,787 | 2/1993 | Skeen et al. . | |
| 5,231,631 | 7/1993 | Buhrke et al. . | |
| 5,265,262 | 11/1993 | Grube et al. . | |
| 5,276,682 | 1/1994 | Van As et al. | 370/85.5 |
| 5,479,404 | 12/1995 | Francois et al. | 370/84 |
| 5,566,331 | 10/1996 | Irwin, Jr. et al. | 395/600 |

FOREIGN PATENT DOCUMENTS

| | | |
|---|---|---|
| 0 413 488 A2 | 8/1989 | European Pat. Off. . |
| 0 535 860 A2 | 4/1991 | European Pat. Off. . |

OTHER PUBLICATIONS

"Anticipating the ISO File Transfer Standards in an Open Systems Implementation", N. K. Petersen et al, Computer Networks and ISDN Systems, vol. 9, No. 4, Apr. 1985, pp. 267–280.

IBM Technical Disclosure Bulletin, vol. 34, No. 7A, Dec. 1991, pp. 261–265, "Method of Bandwidth Management by Dynamic Port Configuration".

IBM Technical Disclosure Bulletin, vol. 35, No. 4B, Sep. 1992, pp. 112–113, "Control Program for Multimedia Workstations".

IBM Technical Disclosure Bulletin, vol. 35, No. 6, Nov. 1992, pp. 278–279, "Automated Accounting Stroage Transaction Unit Methodology".

IBM Technical Disclosure Bulletin, vol. 33, No. 12, May 1991, pp. 113–120, "Technique for Replicating Distributed Directory Information".

IBM Technical Disclosure Bulletin, vol. 34, No. 4B, Sep. 1991, pp. 416–417, "Inter–Client Resource Usage in Distributed Client–Server Presentation System".

(List continued on next page.)

Primary Examiner—Thomas G. Black
Assistant Examiner—C. Lewis
Attorney, Agent, or Firm—Volel Emile

[57] ABSTRACT

A method for providing files to a remote node including the steps of determining whether bandwidth is available for transmitting across a communications link a file requested by a remote node, reserving bandwidth for the requested file if bandwidth is determined to be available, and opening the requested file for transmission only if bandwidth is reserved. In addition, an apparatus for providing files to a remote node including apparatus for determining whether bandwidth is available for transmitting across a communications link a file requested by a remote node, apparatus for reserving bandwidth for the requested file if bandwidth is determined to be available, and apparatus for opening the requested file for transmission only if bandwidth is reserved.

16 Claims, 9 Drawing Sheets

OTHER PUBLICATIONS

*IBM Technical Disclosure Bulletin*, vol. 35, No. 6, Nov. 1992, pp. 409–411, "Method and Apparatus for the Statistical Multiplexing of Voice, Data, and Image Signals".

*IBM Technical Disclosure Bulletin*, vol. 36, No. 3, Mar. 1993, pp. 133–139, "Efficient, Real–Time Address Resolution in Backbone Networks of General Topology".

*IEEE Journal on Selected Areas in Communication*, vol. 7, No. 5, Jun. 1989, "Packet Communication Protocol for Image Services on a High–Speed Multimedia LAN", pp. 782–788.

*Advanced Technology Group Apple Computer, Inc.*, 1991, "Desktop Multimedia Communications—Breaking the Chains", D. Blackketter et al., pp. 73–77.

*Lancaster University, UK,*, "Resource Management in Multimedia Communication Stacks", A. Campbell et al., pp. 287–295.

*IEEE Journal on Selected Areas in Communication*, vol. 8, No. 3, Apr. 1990, "A Scheme for Real–Time Channel Establishment in Wide–Area Networks," D. Ferrari et al., pp. 368–379.

*IEEE Communications Magazine*, Nov. 1990, "Client Requirements for Real–Time Communication Services", D. Ferrari, pp. 65–72.

*Journal of Association for Computing Machinery*, vol. 20, No. 1, Jan. 1973, "Scheduling Algorithms for Multiprogramming in a Hard–Real–Time Environment", J. W. Layland et al., pp. 46–61.

*Globecom '89. IEEE Global Telecommunications Conference and Exhibition Communications Technology for the 1990s and Beyond*, "A Network Environment for Studying Multimedia Network Architecture and Control", R. Lake et al., pp. 1232–1236.

*1992 IEEE International Conference on Selected Topics in Wireless Communications. Conference Proceedings*, "Communications Requirements of Multimedia Applications: A Preliminary Study", T. Kwok, pp. 138–142.

*Technical Reference. Appendix E.*, "AVSS File Format", pp. E1–E33, no date.

*CIP Working Group*, Oct. 1990, "Experimental Internet Stream Protocol", Version 2 (ST–II), C. Topolcic—Editor, pp. 1–148.

*Interational Telegraph and Telephone Consulative Committe (CCITT)*, Period 1989–1992, "COM XI–R 133–E", Working Party XI/6, pp. 1–88.

*RZ 1463 Log #53321) Apr. 25, 1986 Communications 24 pages: Research Report*, "Data/Voice Integration Based on the IEEE 802–5 Token–Ring LAN", F. Cross et al., pp. 1–24.

*Multimedia File Formats/Waveform Audio File Format (WAVE)*, Chapter 8, pp. 40–45.

| | 393 | 394 | 395 | 396 |
|---|---|---|---|---|
| | .FOO | 150 $K_{ps}$ | 50 K | 2 seconds |
| | .BAR | 100 $K_{ps}$ | 30 K | 1 second |

| RESOURCE | LOCATION | CAPACITY | RESERVATION | THROUGH-PUT | BURST | DELAY |
|---|---|---|---|---|---|---|
| ETHERNET ADAPTER | #1 | 2 M/S | SESSION #1 | 150 K/S | 50 K | 1 SECOND |
| | | | SESSION #2 | 100 K/S | 40 K | 2 SECONDS |
| SCSI DISK | #2 | 1 M/S | SESSION #1 | 200 K/S | 50 K | 0.3 SECOND |
| | | | | | | |
| BUS | - | 34 M/S | SESSION #1 | 300 K/S | 64 K | 0.3 SECOND |
| | | | SESSION #2 | 350 K/S | 64 K | 0.2 SECOND |

800 · 810 · 820 · 830 · 840

METHOD AND APPARATUS FOR RESERVING SYSTEM RESOURCES TO ASSURE QUALITY OF SERVICE

This application is a continuation of application Ser. No. 08/084,053, filed on Jun. 29, 1993 and now U.S. Pat. No. 5,581,703.

RELATED PATENT APPLICATIONS

Related patent applications include commonly assigned copending patent application U.S. Ser. No. 08/085,264 filed on filed on the same date as the present application, entitled "SYSTEM AND METHOD FOR PROVIDING MULTIMEDIA QUALITY OF SERVICE SESSIONS IN A COMMUNICATIONS NETWORK", hereby incorporated by reference; commonly assigned copending patent application U.S. Ser. No. 08/085,274 filed on the same date as the present application, entitled "SYSTEM AND METHOD FOR BANDWIDTH RESERVATION FOR MULTIMEDIA TRAFFIC IN COMMUNICATIONS NETWORKS" now U.S. Pat. No. 5,388,097, hereby incorporated by reference; and commonly assigned copending patent application U.S. Ser. No. 08/085,275 filed on the same date as the present application, entitled "MULTIMEDIA RESOURCE RESERVATION SYSTEM", hereby incorporated by reference.

TECHNICAL FIELD

The present invention relates to data processing systems and more particularly to data processing systems providing resource reservation to assure a desired quality of service.

BACKGROUND ART

It has long been known to provide computer workstations interconnected by digital communication networks whereby users of the individual workstations may communicate with one another over the network for tasks such as file serving from a host or server to client computers. This has been previously common, for example, by means of a typed note, data or program file transmitted to another user. More recently, users have increasingly requested multimedia file services, desktop conferencing, remote presentations, and other multimedia applications between network users. However, such multimedia applications utilizing data-intensive sound, voice, and video flows require performance guarantees for high disk access and high bandwidth communication links between distributed computing systems with minimal communication delay, maximum throughput, and instantaneous burst communication capability. As a result, it has become very difficult to schedule appropriate resources to meet the requirements of such multimedia applications.

Prior art has recognized that certain data in a network, such as that associated with multimedia, may require priority handling. Thus, for example, a "quality of service " (QOS) or bandwidth has been defined in the literature. Quality of service or bandwidth seeks to describe various parameters which may be specified in an attempt to define certain minimum requirements which must be met for transmission of given data types over the network. See, for example, quality of service standards set forth in the OSI TP4 Open System Interconnect Standard X.214 and the quality of service standards defined in CCITT Q.931 (ISDN), Q.933 (frame relay), and Q.93B (B-ISDN ATM) drafts. As yet another example there is an architected priority mechanism in the IEEE 802.5 Token Ring. A station on the ring with a high priority frame to send may indicate this in an access control field of a passing frame. When a station sending the frame releases the token, it releases the token at the priority of the AC field, and eventually sets it back to its original priority as specified in an IEEE 802.5 medium access control protocol. The IEEE standard and implementations thereof merely specify a protocol for increasing and decreasing priority. However, the user of such a service, such as a client-server file system, has to determine when service guarantees are needed for certain file accesses. For example, multimedia file reads for playing sound, voice, and video from a server to a client need certain quality of service guarantees.

Allocating resources when a connection is made between digital computers, such as for a client-server session, is known where memory is allocated to hold information related to the session. Buffers are also commonly reserved for file access on computers, such as on a server computer. Buffers may also be reserved on the client computer for multimedia file where a memory buffer must be large enough to store a reserve of file elements so that variations in delay between the server and client are absorbed. That is, there should be enough file elements stored in the memory buffer so that the buffer will not go empty during the playback of sound, voice or video. Otherwise, a glitch or jitter will occur causing a deterioration in the quality of a presentation. For example, if the maximum delay is two seconds and the multimedia flow averages 150 kilobytes per second, then a buffer at least 300 kilobytes in size is needed to preserve quality of service.

Many types of files contain information in their header useful for determining such quality of service parameters. Other types of files may require that the file be read, parsed or scanned to determine such quality of service parameters. However, in a general purpose client-server environment, a very large variety of file types and formats exist and a file server may not be programmed to determine quality of service parameters in all cases. In addition, an application program, running on a workstation in a client-server environment, may not recognize whether a file being accessed is located on the workstation or on a remote file server. If the file is located on the application program workstation, then quality of service is generally met. However, if the file being accessed is located on a remote server, then the file access must contend for server resources such as disk cycles or bandwidth, disk controller cycles, system bus resources, server processor resources, and network resources. As a result, it is difficult to maintain quality of service in a client-server environment for remote file accesses.

DISCLOSURE OF THE INVENTION

A method for providing files to a remote node including the steps of determining whether bandwidth is available for transmitting across a communications link a file requested by a remote node, reserving bandwidth for the requested file if bandwidth is determined to be available, and opening the requested file for transmission only if bandwidth is reserved. In addition, an apparatus for providing files to a remote node including apparatus for determining whether bandwidth is available for transmitting across a communications link a file requested by a remote node, apparatus for reserving bandwidth for the requested file if bandwidth is determined to be available, and apparatus for opening the requested file for transmission only if bandwidth is reserved.

A further understanding of the nature and advantages of the present invention may be realized by reference to the remaining portions of the specification and the drawings.

BEST MODE FOR CARRYING OUT THE INVENTION

Figure 1:
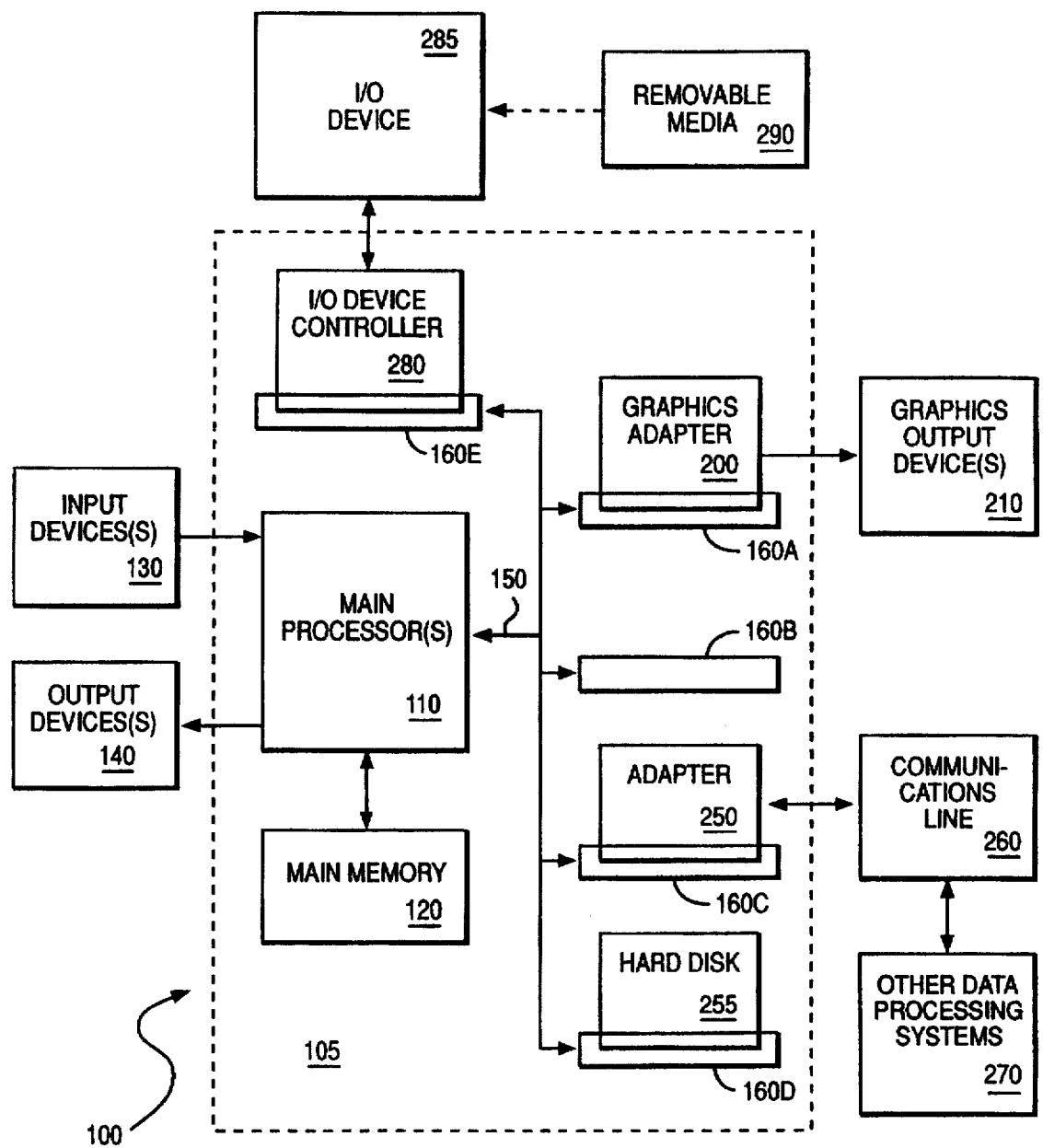
FIG. 1 is a block diagram of a typical data processing system utilized by a preferred embodiment of the invention.

FIG. 1 is a block diagram of a typical data processing system 100 utilized by a preferred embodiment of the invention. The data processing system includes main processor(s) 110 coupled to a main memory 120 in computer box 105 with input device(s) 130 and output device(s) 140 attached. Main processor(s) 110 may include a single processor or multiple processors. Input device(s) 130 may include a keyboard, mouse, tablet or other types of input devices. Output device(s) 140 may include a text monitor, plotter or other types of output devices.

The main processor may also be coupled to graphics output device(s) 210 such as a graphics display through a graphics adapter 200. Graphics adapter 200 may be located in an adapter slot 160A. Graphics adapter 200 receives instructions regarding graphics from main processor 110 on bus 150, thereby rendering the desired graphics output from the main processor.

A communications adapter 250 such as a modem or a network adapter for networks such as token ring or ethernet may be located in slot 160C. The slot provides communications with main processor 110 across bus 150. Communications adapter 250 may communicate with other data processing systems 270 across communications line 260. As a result, the main processor may communicate with other data processing systems 270 via bus 150, slot 160C, communications adapter 250 and communications line 260.

A hard disk 255 may be located in slot 160D to provide additional memory for use by the main processor. Computer readable removable media 290, such as a magnetic diskette or a compact disc, may be inserted into an input/output device 285, such as a disk drive or a CD-ROM (compact disc—read only memory) drive. Data is read from or written to the removable media by the I/O device under the control of the I/O device controller 280. The I/O device controller communicates with the main processor through slot 160E across bus 150. Main memory 120, hard disk 255 and removable media 290 are all referred to as memory for storing data for processing by processor 110. One of the preferred implementations of the present invention is as several sets of instructions in a code module resident in the main memory 120. Until required by the computer system, the sets of instructions may be stored in another computer memory, for example, in a hard disk drive, or in a removable memory such as an optical disk or floppy disk for eventual use in a CDROM or the floppy disk drive.

Figure 2:
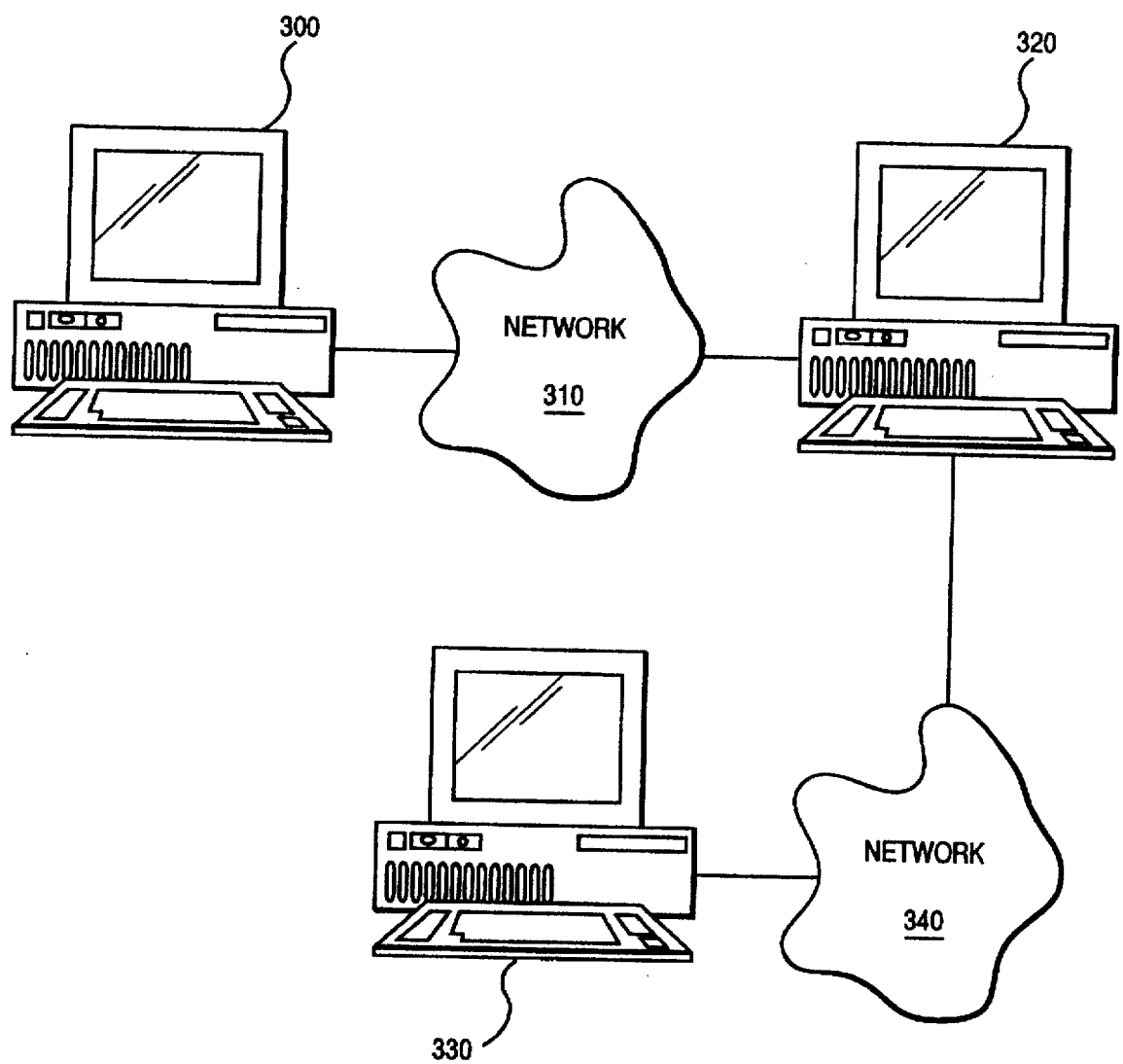
FIG. 2 is an illustration of a data processing system including three workstations interconnected by a network in accordance with the subject invention.

FIG. 2 illustrates a data processing system comprising a number of workstations (here, three workstations 300, 320, and 330) interconnected by a pair of data networks 310 and 340 (also referred to as communications links), so as to permit communication between the workstations (also referred to as nodes). It is assumed that the data processing shown in FIG. 2 is of a type which permits concurrent real-time communication between the users. The network operates according to a conventional network protocol, such as the token ring protocol described in *Token Ring NetWork Architecture* reference, SC30-3374, IBM, 1989.

FIG. 2 depicts only one possible hardware configuration for a data processing network. Other configurations are possible. For example, the data processing system could be based upon a star network, or a host processor connected to a plurality of dumb terminals, or could further be based upon a plurality of remote processors connected by a communication network. the networks could also be based upon the telephone network, and ISDN network, or any other "dial up" networks. Moreover, the workstations could be located within the single workspace or within a local area, or could be remote from one another. A source for detailing technical planning information for configuring a network of workstations in accordance with the invention, is the *IBM Extended Services for OS/2 Example Scenarios Manual*, 1991.

Multimedia computing is the processing of various media, such as video, waveform audio, musical instrument digital interface (MIDI) streams, animation, graphics, and text. Media processing includes the capture, authoring (editing) and playback of media streams as well as other data processing applications. Multimedia documents which are stored on some non-volatile medium, such as a disk, are referred to as recorded multimedia applications. There are also live multimedia applications in which two or more people communicate with each other at the same time using a computer. Live multimedia applications are normally conducted across space and time indicating that live multimedia is inherently distributed. Even recorded multimedia applications require distributed file system services to share large volumes of stored media, such as video disk, audio information, or computer-generated images. Thus, it is critical that a prioritizing scheme in accordance with the invention for multimedia applications includes support for a distributed environment.

To reduce design complexity, most networks are organized as a series of layers, each one built upon its predecessor as described in *Computer Networks*, Tannenbaum, Andrew S., Prentice Hall (1988) and *OSI, A Model for Computer Communications Standards*, Black, Ulyess, Prentice Hall, 1991. The number of layers, the name of each layer, contents, and function of each layer differ from network to network. However, in each network, the purpose of the layers is to offer certain services to the higher layers, shielding those layers from the details of how the offered services are actually implemented. The purpose, function, and details of each of the layers and their interaction is set forth in the previously noted references and is familiar to communication programmers ordinarily skilled in the art.

Priority assurance is an important factor in ensuring bandwidth or quality of service, and is enabled by operation of a component which may be implemented in hardware logic or software. The component regulates access to the priority queue or transmit channel that is attached to the shared medium local area network section. Access to the priority queue or transmit channel will pass through this component, thus subjecting all communication transactions to rejection or tracking by the component. A more detailed discussion of this component and the related station's bandwidth manager component are described in commonly assigned copending patent application U.S. Ser. No. 07/930, 587, filed Aug. 17, 1992, entitled "Network Priority Management" (IBM Docket No. AT9-92-089), hereby incorporated by reference.

Figure 3:
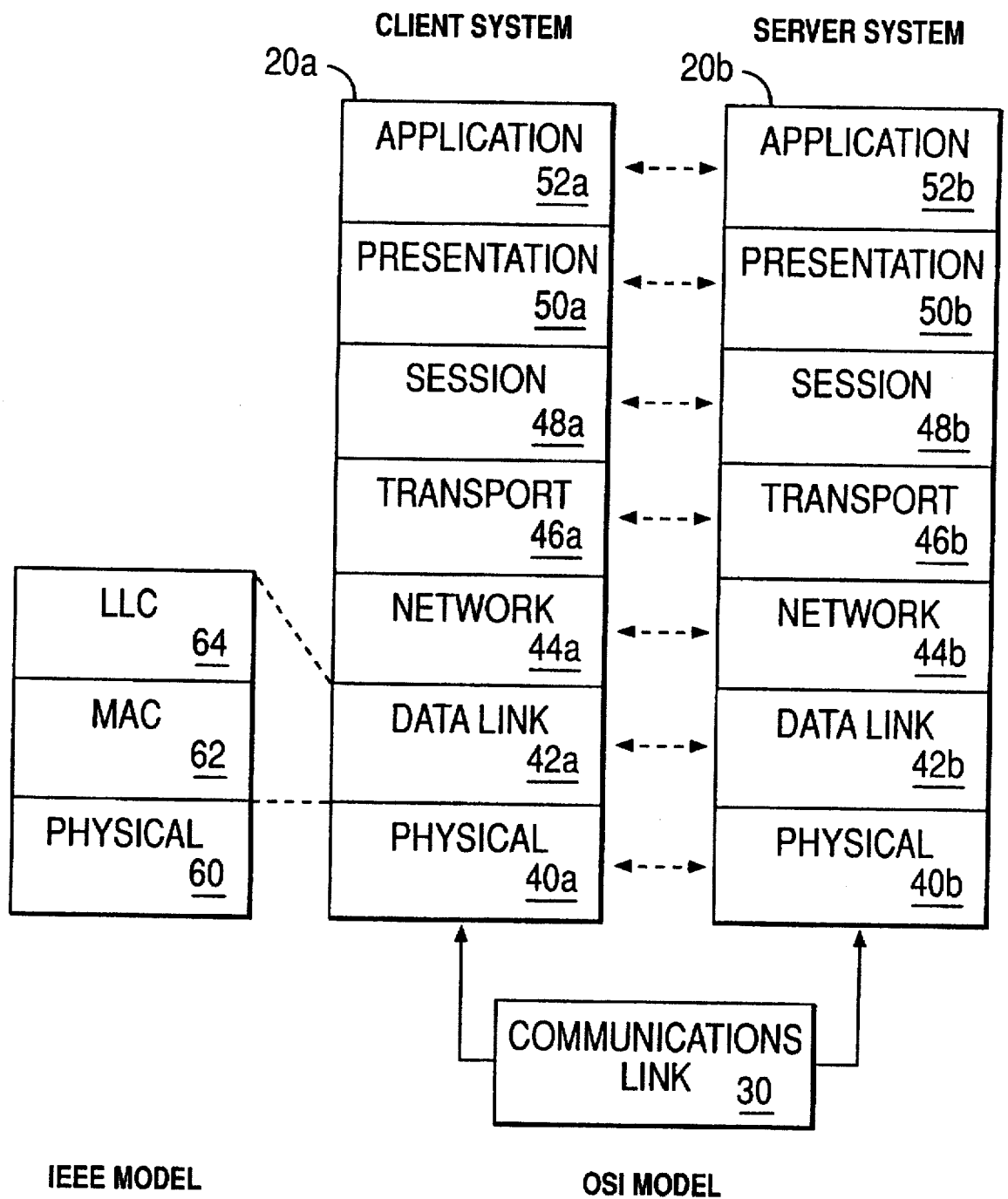
FIG. 3 is a block diagram illustrating a multilayered computer communication network model based upon the OSI layered reference model.

FIG. 3 is a block diagram illustrating a multilayered computer communication network model based upon the OSI layered reference model. Further detail of this OSI and related IEEE models may be found in *OSI, A Model for Computer Communications Standards*, infra. A client system 20A is shown communicating with a server system 20B across a communications link 30. The seven layers of the OSI model for each system are shown as reference numerals 40-52. The lowest layer is physical layer 40A-40B which is responsible for implementing a physical circuit between data terminal equipment and data circuit terminating equipment.

A data link layer 42A-42B is responsible for transfer of data across the link. A network layer 44A-44B specifies the interface of the user into a network and also defines network switching/routing and communications between networks. A transport layer 46A-46B provides an interface between the data communications network and the upper three layers. This layer is of particular interest because it provides the user options in obtaining certain levels of quality, and is designed to keep the user isolated from some of the physical and functional aspects of the network. A session layer 48A-48B serves as a user interface into the transport layer below, providing a means for exchange of data between users such as simultaneous transmission, alternate transmission, checkpoint procedures and the like. The remaining two layers, a presentation layer 50A-50B and an application layer 52A-52B ensure that user applications can communicate with each other and further concern the support of the end-user application process. Please note that each of the client system layers is shown communicating with the corresponding server system layers. Although each of the layers perceives that these communications are direct, the communications are shown as dotted lines because the only direct communications are performed through the network.

It will be noted from FIG. 3 that there are other implementations in the art of such an OSI reference model bearing varying degrees of similarity thereto, a portion of one being depicted in the left part of FIG. 3 as the IEEE model, a physical layer 60 may be seen corresponding to the physical layer of the OSI model. The IEEE recognized a need to divide the data link layer into two sublayers in order to handle different link configurations and thus a medium access control (MAC) 62 and logical link control (LLC) 64 were provided for. The sublayer is protocol-specific (such as to a LAN such as Ethernet) whereas the LLC serves as an interface to an upper layer protocol, typically the network layer (and isolates the network layer from the specific actions of the MAC sublayer). One purpose of depicting varying forms of a multilayered computer communication network in FIG. 3 is to illustrate that the invention admits to implementations in any number of such multilayered models, and is thereby not intended to be limited to application to the OSI reference model emphasized in the description herein.

Figure 4:
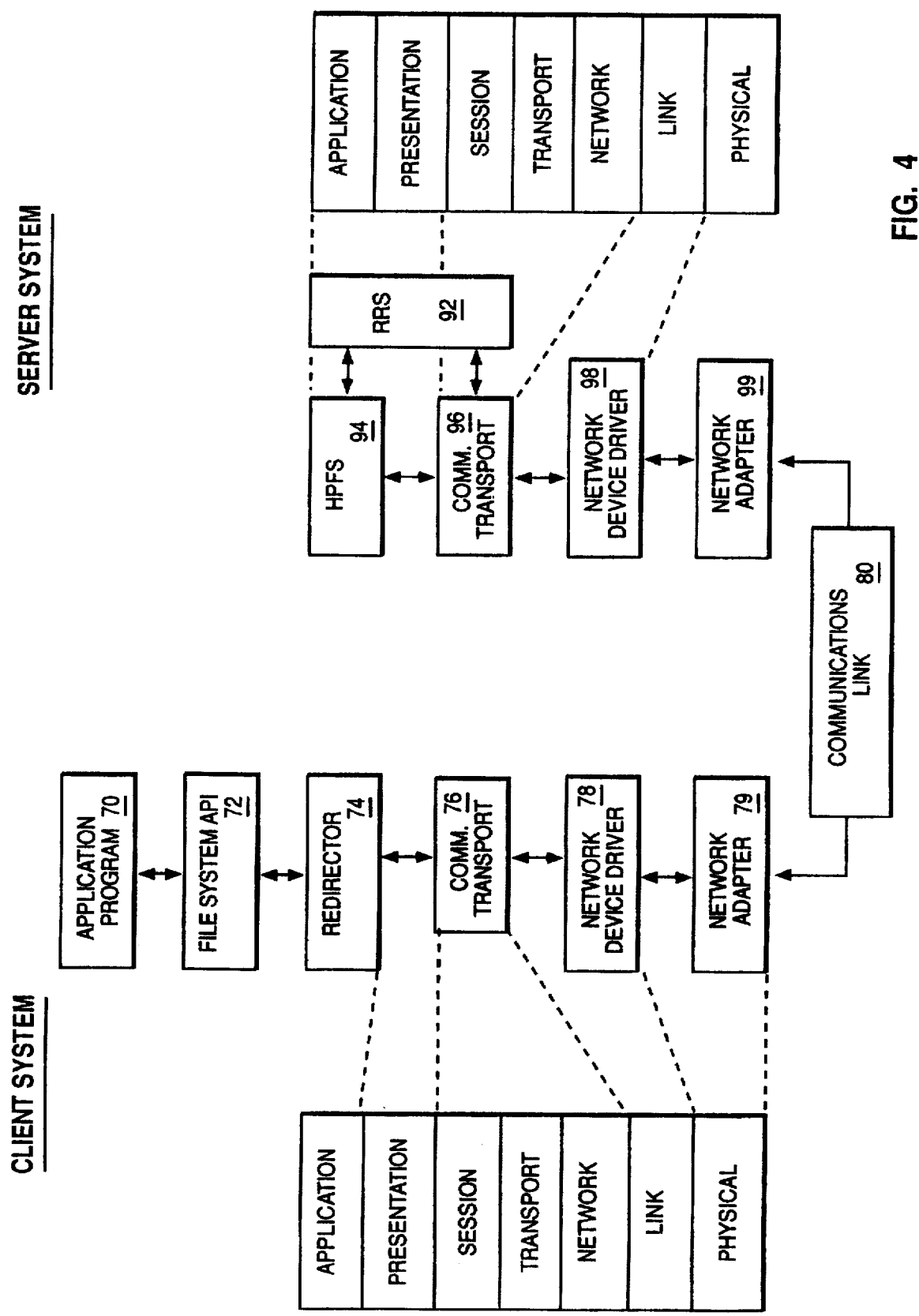
FIG. 4 is a block diagram of a preferred layered open systems interconnection model showing the relationship of components of the subject invention to the layers.

FIG. 4 is a block diagram of a preferred layered open systems interconnection model showing the relationship of components of the subject invention to the layers and to the data processing system. An application program 70 on a client system seeks a file to be accessed through a file system application program interface (API) 72 to a redirector 74. If the file is not located on the client system, then the redirector determines which remote system, such as the server system, has the desired file. If the file is located on the client system, then the file is accessed on a local file system not shown. If the file is located on the server system, then the redirector passes a request for access to the desired file to the server system through a communications transport 76 (such as netbios or TCP/IP) to a network adapter device driver 78. The network device driver then sends the request to the server system through a network adapter 79 across a communications link 80 (such as ethernet or token ring) to the server system network adapter 99 and network adapter device driver 98. The network adapter device driver then passes the request on to the communications transport 96. The communications transport then passes the request on to a high performance file system (HPFS) 94. The high performance file system then passes the file request onto a resource reservation system (RRS) 92. The resource reservation system then determines whether there are any quality of service parameters for the requested file. If not, then the resource reservation system so notifies the high performance file system. The high performance file system then accesses the file on a local disk drive not shown. If the resource reservation system determines that there are quality of service parameters for the requested file, then the resource reservation system then automatically reserves the appropriate resources to ensure that the quality of service for the file is maintained. This process will be described in detail below. The resource reservation system so notifies the high performance file system. The high performance file system then opens and accesses the file through a local file system to a local disk drive. Access to the file is then provided to the requesting application program, with quality of service guarantees if established, and the application program is so notified. This notification occurs through communications transport 96, network device driver 98, network adapter 99, communications link 80, network adapter 79, network device driver 78, communications transport 76, redirector 74, and file system API 72. Please note that the elements of the client and server systems are shown corresponding to layers of the OSI model described above. In addition, the elements of the client and host systems correspond to the elements of the data processing system described above. Elements 70-78 reside in memory of the client system and are executed by the client system processor. Network adapters 79 and 99 are communications adapters for the client and hosts systems respectively. In addition, portions of the network adapter device drivers may reside on and be executed by the network adapters. Communications link 80 may be a network such as Ethernet or Token ring. Elements 92-98 reside in memory of the host system and are executed by the host system processor.

This system allows for easy access to the files across a network and also provides the capabilities for an automatic resource reservation system as will be described below.

Determining Quality of Service Parameters

There are many types of quality of service parameters known in the art. The parameters of particular interest to a preferred embodiment of the invention are throughput, burst, and delay. Throughput is the average amount of information passed through the communications link in a given period of time such as 150 kilobytes per second. Burst is the maximum amount of information passed through the communications link in a short period of time. Delay is the maximum amount of delay that can be tolerated, typically due to buffer size in relation to throughput.

Default quality of service parameters may be provided for files for types of files. That is, files are typically stored as XXXXXX.YYY where .YYY is the extension of the file. The extension typically describes the type of the file (e.g. .VOC for a voice file and .WAV for a wave file). These default values may be provided.

Figures 5, 6:
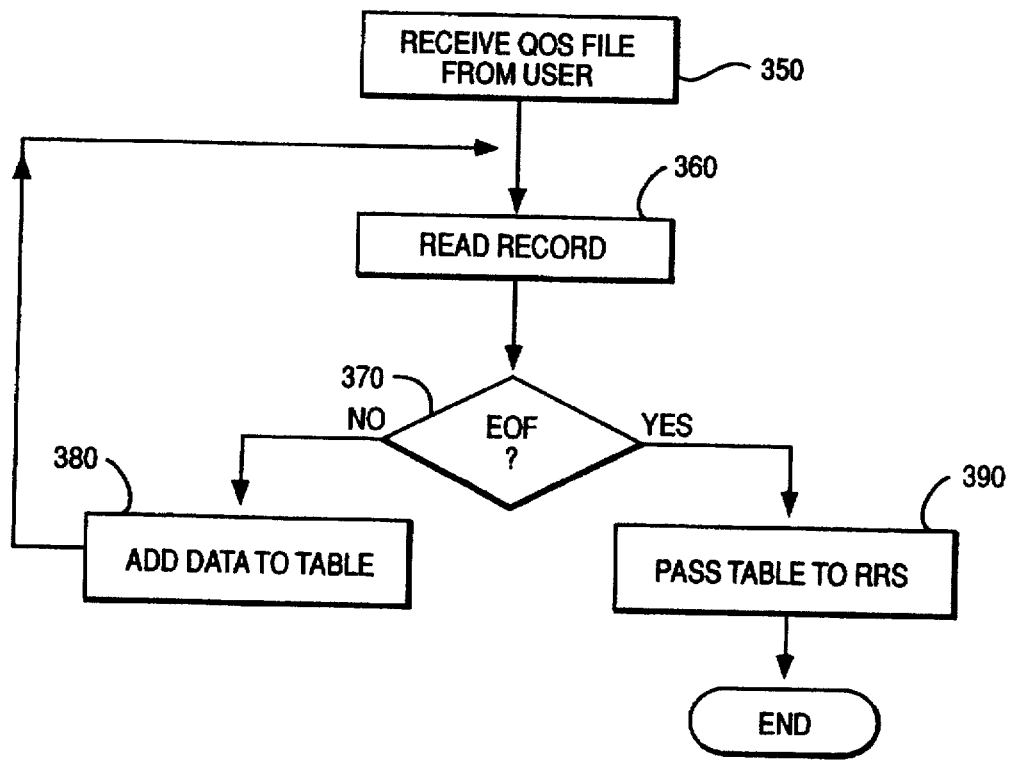
FIG. 5 is a flowchart illustrating initializing a host system with default quality of service parameters for types of files.
FIG. 6 illustrates a default table generated by the process described in FIG. 5.

FIG. 5 is a flowchart illustrating initializing a host system with default quality of service parameters for types of files. In step 350, the user provides to the high performance file system (HPFS) a quality of service (QOS) file listing file types and quality of service parameters for each file type. The user may provide this QOS file in a variety of ways. A soft copy of a QOS file may be provided with a set of multimedia files by a vendor and provided therewith for installation by the user or the vendor may provide a software tool for the user to use to create the QOS file. In addition, the user may respond to a set of queries from the host system. In step 360, the first entry in the QOS file is read. In step 370, if end of file is not reached, then processing continues to step 380. In step 380, a description of the file type and its quality of service parameters are extracted from the record and added to a default table in memory. FIG. 6 illustrates a default table 392 generated by the process described in FIG. 5. The default table may include values for file type 393, throughput 394, burst 395, and delay 396. Processing then returns to step 360 to read the next record in the QOS file. If end of file is reached in step 370, then the default table containing the file types and quality of service parameters are provided to the resource reservation system (RRS) for later use as will be described below.

Figure 7A:
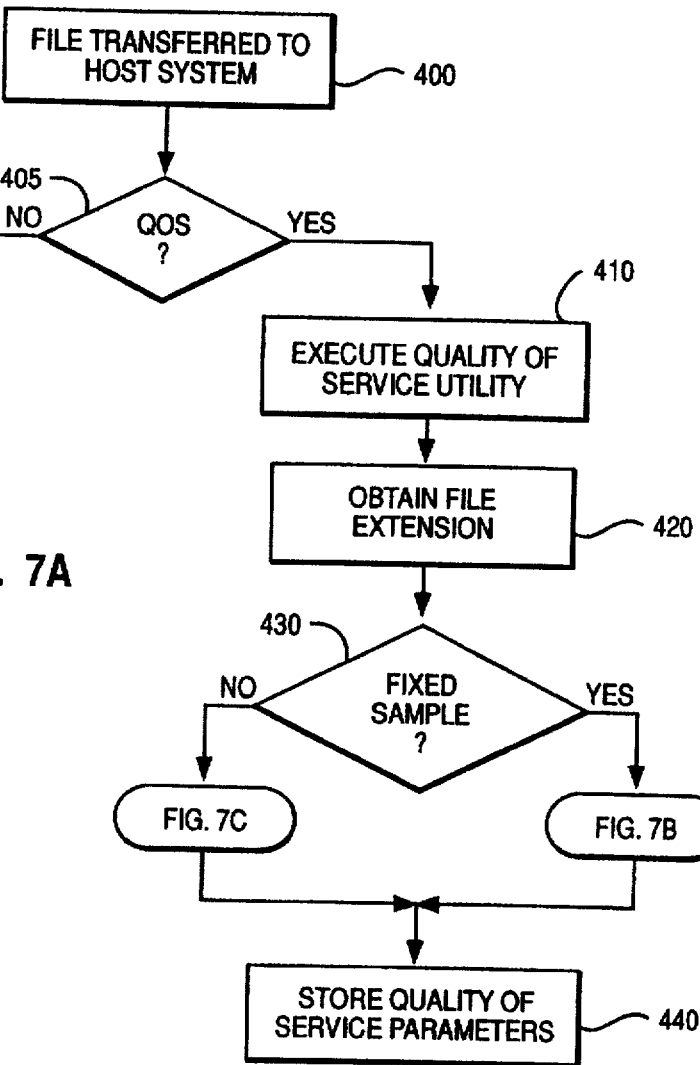
FIGS. 7A-7C are a flowchart illustrating a preferred method for individually determining quality of service parameters for files.
Figure 7B:
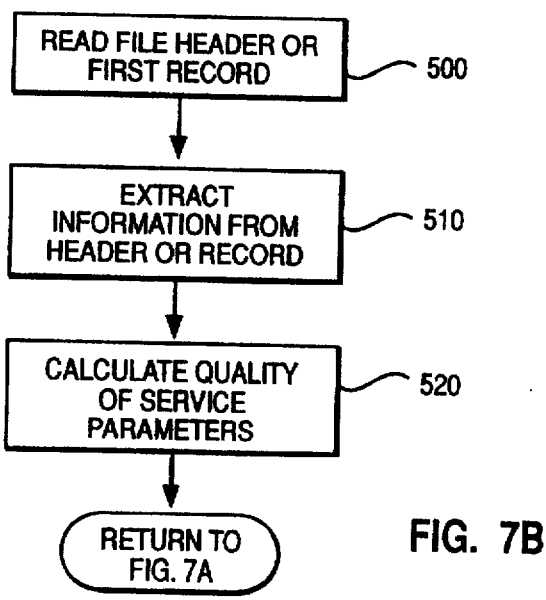
Figures 7C, 8:
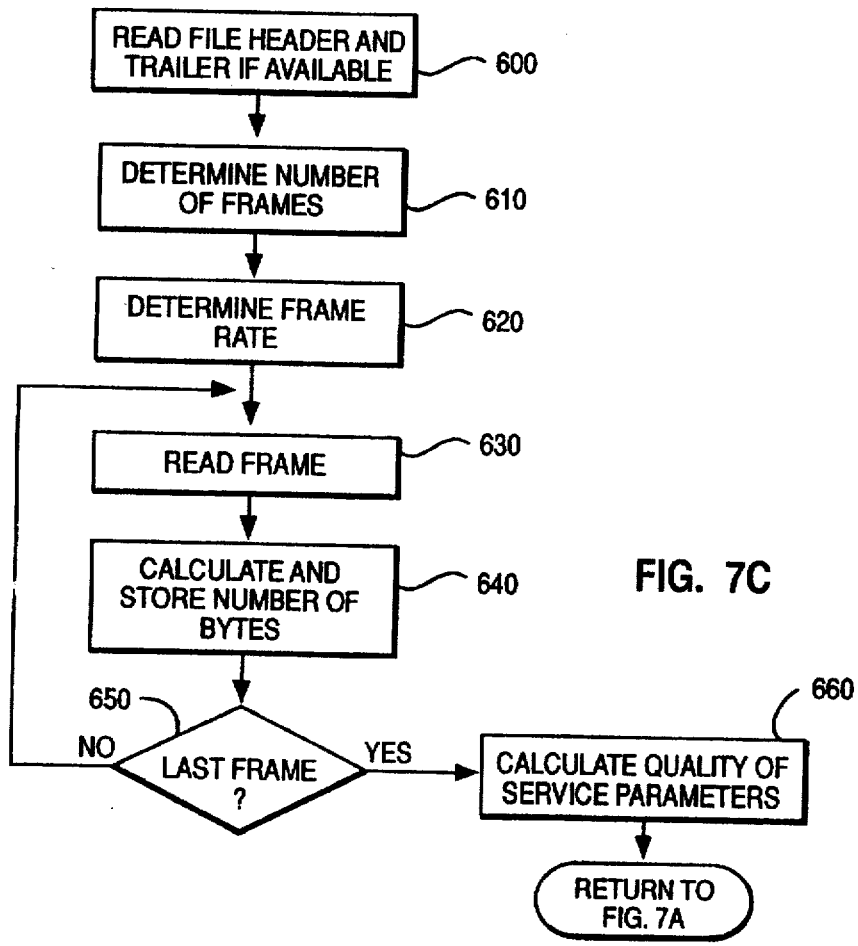
FIG. 8 is a block diagram of a reservation table utilized by the resource reservation system to handle resource reservations according to a preferred embodiment of the invention.

FIGS. 7A–7C are a flowchart illustrating a preferred method for individually determining quality of service parameters for files. There are many types of files which may require quality of service and it is preferable to obtain the quality of service parameters for an individual file when that file is transferred to the host computer for storage on the host computer. This individual determination of quality of service parameters for files may be performed automatically for certain types of files such as voice (VOC), wave (WAV), audio-visual (AVI), or other types of multimedia files. These quality of service parameters may also be obtained by querying the operator as the files are transferred and stored in the host computer. In an alternative embodiment, the quality of service parameters may be determined when a file is first used or at each use of a file. In another alternative embodiment, the quality of service parameters may be determined for an application by accumulating the quality of service parameters of each file to be accessed by the application.

In step 400, the file is transferred to the host computer for storage. The host computer may receive the file from an external media such as a CD-ROM or floppy disk, or from another data processing system across a communications adapter. In step 405, it is determined whether quality of service parameters are to be calculated for the transferred file. The user may request calculation of quality of service parameters by using a particular command to transfer the file to the host system. In addition, the host system may automatically calculate quality of service parameters for certain types of files. If no parameters are to be calculated, then processing ends. Otherwise, in step 410, a quality of service calculation utility may be executed to determine the quality of service parameters for the file. This utility may be executed at the request of the user storing the file on the host system or the utility may be automatically executed for certain types of predesignated files. In step 420 the extension of the file is obtained. That is, files are typically stored as XXXXXX.YYY where .YYY is the extension of the file. The extension typically describes the type of the file (e.g. .VOC for a voice file and .WAV for a wave file). Multimedia files are preferably distinguished into two types, fixed sample or variable sample. Fixed sample files have fixed length sample records and may include a header record describing the records. An example of a fixed sample file is a voice (VOC) file which typically has a header followed by a number of contiguous bytes, each byte being an eight sample. The header provides information about the sampling rate (e.g. 8000, 11000 or 44000 samples per second) and the number of channels (e.g. one for mono, two for stereo, more than two for multichannel). Variable sample files have variable length sample records and require greater processing to determine quality of service parameters according to the preferred embodiment of the invention. An example of a variable sample file is a digital video interactive (DVI) file which has a series of reference frames with two or more delta frames interspersed between each pair of reference frames. The size of the delta frames depends on the amount of movement occurring between reference frames. In step 430, based on the extension, if the file is a fixed sample file then processing continues to the flowchart of FIG. 7B. If the file is a variable sample file, then processing continues to the flowchart of FIG. 7C.

Once the quality of service parameters are obtained, then in step 440, the quality of service parameters are preferably stored as extended attributes of the file. That is, many operating systems such as OS/2 (trademark of International Business Machines Corp.) have the capability of storing and retrieving extended attributes for any file without requiring the file be opened. Extended attributes are described in detail in the *OS/2 2.0 Technical Library, Programming Guide*, Volume 1, Version 2.00, hereby incorporated by reference. As a result, the extended attributes may be accessed to determine whether appropriate resources are available for utilizing the file prior to opening the file. In alternative embodiments, the quality of service parameters may be stored in the file or may be stored in a table with reference to the file. If the quality of service parameters are determined each time the file is used, then the parameters do not need to be stored.

FIG. 7B is a flowchart illustrating a preferred method for determining quality of service parameters for fixed sample files (that is, files that have fixed length records for each sample and typically have a header record describing the records). In step 500, the file header is read. If a file header is not available, then the first record in the file is read. In step 510, information for determining quality of service is extracted from the file header or the first record. For fixed sample records, the number of concurrent channels or data streams, the frequency of sampling data, and the sample size are extracted from the file.

In step 520, the quality of service parameters are calculated from the information obtained from the file. These parameters are determined for reading the files. However, the parameters could also be determined for writing to the files. The quality of service parameters typically determined are read throughput and read burst. Throughput is the average number of bits or bytes needed to transmit per second in order to provide realtime use of the data. Factors includes the number of channels (mono, stereo or multichannel), the sampling frequency, and the sample size. For example, the throughput would be equal to the number of data streams times the sample frequency times the sample size. That is, a stereo signal with a sample rate of 44 kilohertz with a sample size of 16 bits per sample may be utilized for compact disk quality music file for a throughput of 176 kilobytes per second. In addition, other QOS parameters such as burst, minimum data throughput, maximum data throughput, or other measures may be calculated. Burst is the amount of data typically transmitted in a short time interval. Other possible parameters could be determined including various measures of dispersion for variable sample files. For example, a throughput average and a throughput standard deviation could be determined. These parameters are determined by determining the amount of data to be transmitted. Processing then returns to FIG. 7A where the parameters are then stored as extended attributes of the file.

FIG. 7C is a flowchart illustrating a preferred method for determining quality of service parameters for variable sample files (that is, files that have fixed length records for each sample and typically have a header record describing the records).

In step 600, the file header and file trailer are read if available. In step 610, the number of frames in the file of video is determined from information in the header or trailer. In step 620, the frame rate is also determined based on information in the header or trailer of the file. For example, NTSC (National Television Standard Committee) signals are 29.97 frames per second and PAL television signals are 25 frames per second. In step 630 the first frame of the file is read. In step 640 the number of bytes in the frame is calculated and stored. In step 650 it is determined whether this is the last frame in the file. If no, then processing returns to step 630 to read the next frame and extract information from that frame. If yes, then in step 660, the various quality of service parameters are calculated including throughput and burst. Processing then returns to FIG. 7A where in step 450, the quality of service parameters are then stored as extended attribute of the file.

Determining Network Capacity

Before reservation of resource capacity is performed, it is preferable that the amount of that capacity be determined for the various types of networks and other resources that may be reserved. Resource capacity may easily be obtained by querying the operator of the system. However, the operator may not know the capacity or the capacity may vary since the operator was queried. For example, a network may be slowed by more clients being added to the network, thereby increasing network overhead. Resource capacity may also be determined by determining what resources are available. For example, the host system may detect what resources are on the system during initial program load (sometimes referred to as sniffing). The host system may then compare the resources detected to a table listing capacities for all types of resources to determine what the resource capacity is. Resource capacity may also be determined by running some benchmarking tools to detect what the actual capacity of the resources are. For example, a series of reads and writes to a disk drive to determine its capacities.

Reserving Quality of Service

FIG. 8 is a block diagram of a reservation table 800 utilized by the resource reservation system to handle resource reservations according to a preferred embodiment of the invention. The reservation table includes a listing of each resource 810, its location 820, and its capacities 830 that are available for reservation. The reservation table also includes a variable number of reservations 840 for each resource. For example, an ethernet adapter located in adapter slot #1 has a capacity of 2 megabytes per second and has two reservations of that capacity.

Figure 9A:
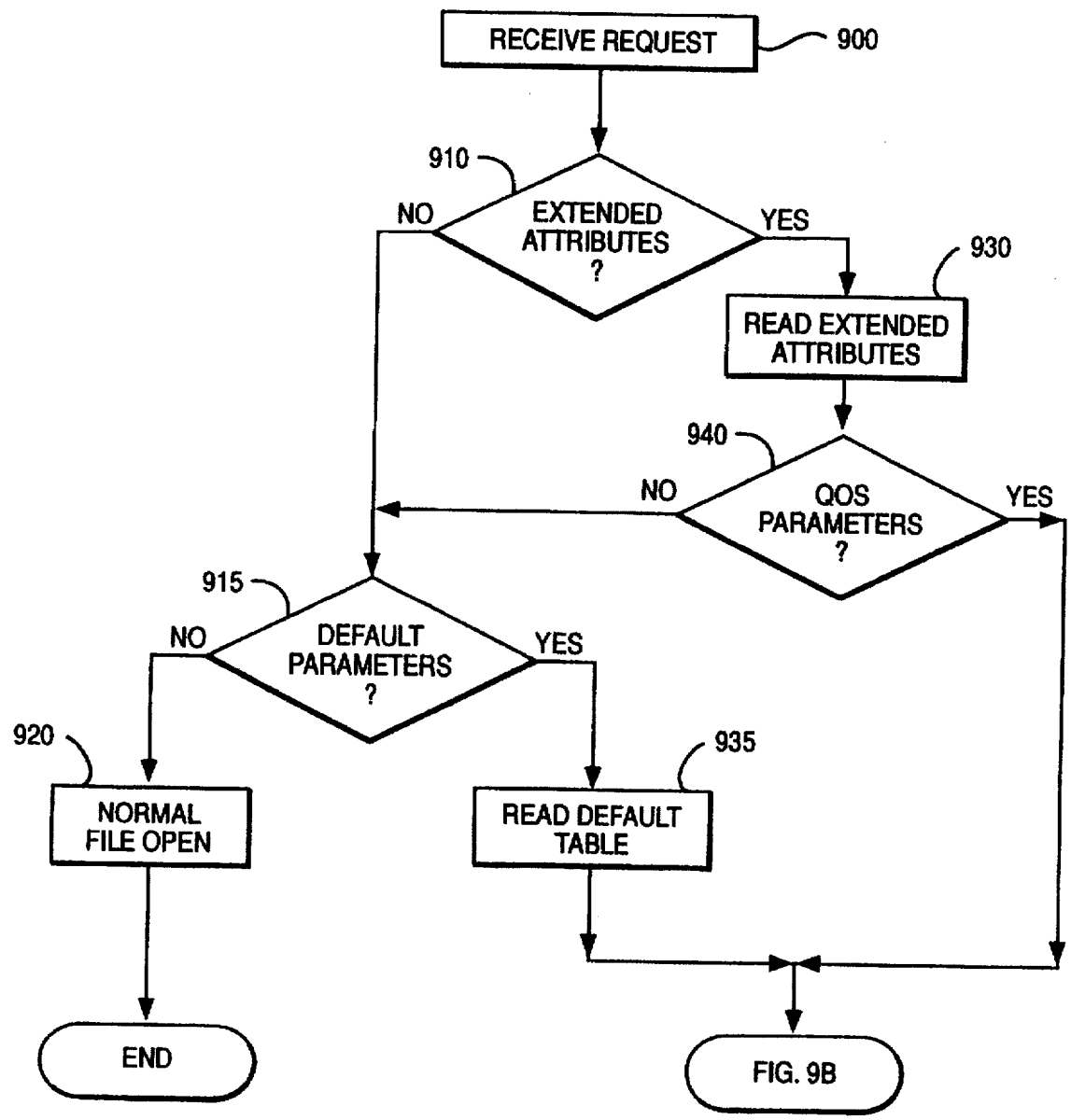
FIGS. 9A-9B are a flowchart illustrating a preferred method for reserving a desired quality of service of various resources.
Figure 9B:
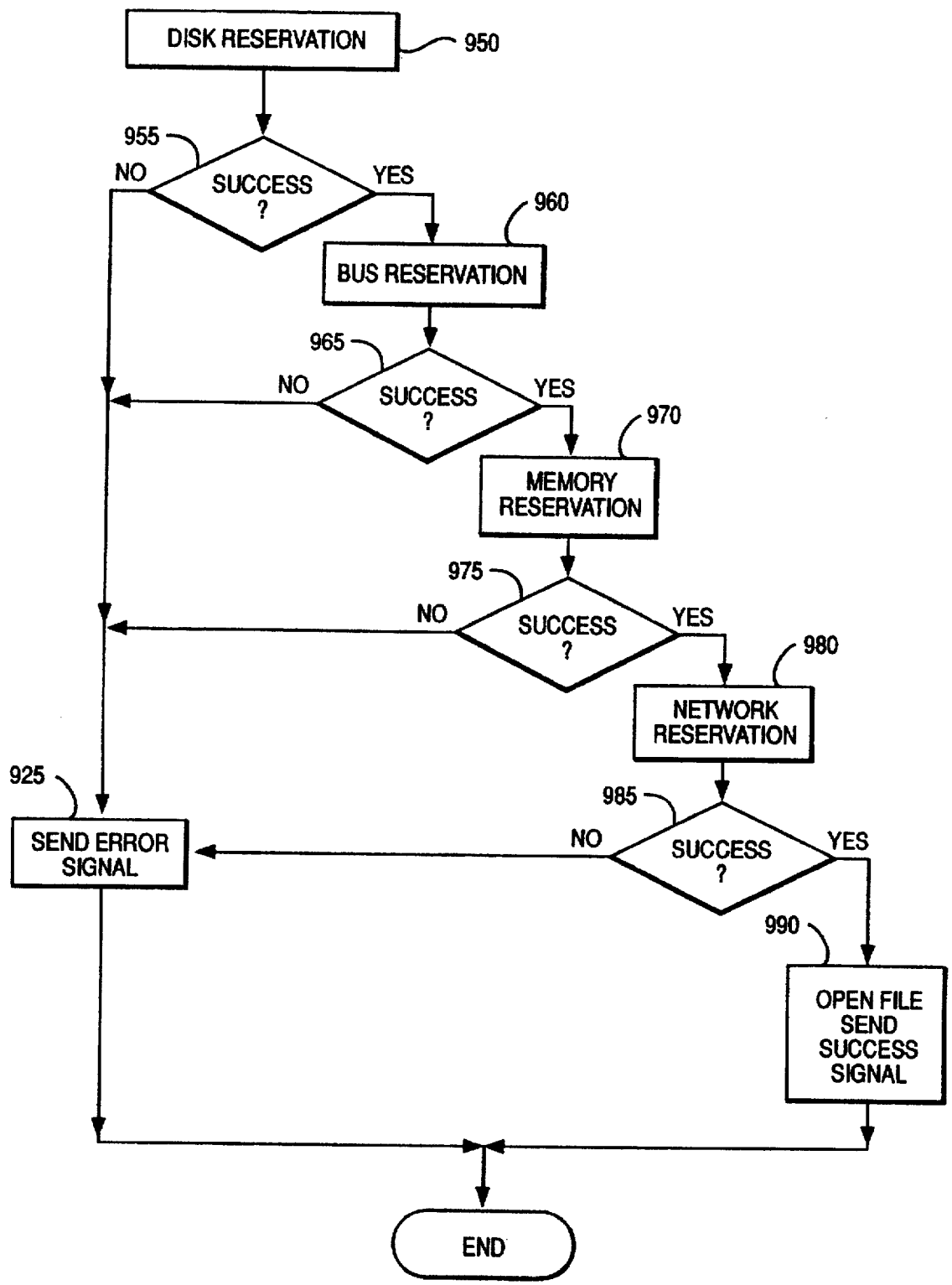

FIGS. 9A-9B are a flowchart illustrating a preferred method for reserving a desired quality of service of various resources. This reservation process is preferably performed for desired files, typically multimedia or other types of files requiring uninterrupted service, as those files are opened. However, the below described process may also be utilized for providing quality of service for desired sessions or applications. The below processing steps typically occur when a request is received by the host system from an application program to open a file for transmission across the network. This request may be in the form of a read, write or other type of command. Typically, the application program making the request is located on a client system on the network and will be needing the contents of the file for use by the application program.

In step 900, the request is received from an application program to open a file on the host system for use across the network. The file may be a type of file that needs a reservation to preserve quality of service or the application program may request that a reservation be made for the file. In the preferred embodiment, the high performance file system (HPFS) identifies a file needing reservation by matching the extension of the file against a list of file extensions provided by the resource reservation system (RRS). In step 910 the HPFS determines whether the file has any extended attributes. If not, then processing continues to step 915. If extended attributes for the file do exist, then in step 930 the HPFS reads extended attributes into memory. In step 940 the HPFS determines whether quality of service (QOS) parameters are found in the extended attributes. If not, then processing returns to step 915. In step 915, the RRS determines whether any default parameters exist for the requested file. If so, then the quality of service parameters are read from the default table. If default parameters do not exist, then there are no quality of service parameters for the file and a normal file open is performed. In an alternative embodiment, the host system may then determine quality of service parameters of the file at this time, possibly at the request of the client system. In this alternative embodiment, processing would then continue to step 950 below.

If quality of service parameters are found or determined in either extended attributes of the file or in the default table, then processing continues to making a reservation for the file by utilizing the resource reservation system. In step 950 a reservation is made on disk to meet the quality of service needs for the file. For example, a video stream may require 150 kilobytes per second while a disk may have 1.8 megabytes per second bandwidth. In this step the reservation to the disk for 150 kilobytes per second is made. In step 955, if the disk reservation is not successful then the open is failed and processing continues to step 925. In step 925, an error signal is returned to the application program originating the file request. The application program may then request the file be opened without a reservation. In an alternative embodiment, the command received from the remote system may include an instruction to open the file even if quality of service is not reserved. In this alternative embodiment, processing would continue to step 920 for opening the file. If the disk reservation is successful, then in step 960 a bus reservation is made to meet quality of service needs for the file. For example, one would reserve 150 kilobytes per second for a video stream for the bus. In step 965, if the bus reservation is unsuccessful, then processing returns to step 925 for generating an error signal to the application program. If a bus reservation is successful, then in step 970 main memory is reserved to meet quality of service needs for the file. For example, one may need to reserve 64 kilobytes per second of memory for the read buffer to satisfy a video system read. In step 975 it is determined whether the memory reservation is a success. If not, then processing returns to 925. Otherwise, processing continues to step 980 where a network reservation is made to meet quality of service needs for the file. For example, a video stream may need 1.2 megabyte per second reservation on the network. In step 985, if the network reservation is not a success, then processing returns to step 925 to generate an error signal to the application program. Otherwise, in step 990, the file is opened and a success signal is returned to the requesting application program indicating that the file is available with reserved quality of service.

One main advantage of the present invention is that a file may not be opened for transmission until a reservation is made. Opening a file for transmission is an operation requiring a large amount of overhead for the host system. That is, in typical data processing systems, a file directory in the host needs to be read and control structures enabling access to the file need to be set up. This overhead is particularly cumbersome when the host system is already heavily loaded or overloaded with many demands on its system resources. As a result, the present invention helps relieve that burden by not requiring a file opening when resources are not available.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A method for providing files to a remote node comprising the steps of:

determining whether bandwidth is available for transmitting across a communications link a file requested by a remote node;

reserving said bandwidth for the requested file if said bandwidth is determined to be available; and opening the requested file for transmission only if said bandwidth is reserved.

2. The method of claim 1 further comprising a step of notifying the remote node that said bandwidth is determined not to be available for transmitting the requested file.

3. The method of claim 1 further comprising a step of determining bandwidth requirements for transmitting the file.

4. The method of claim 3 wherein the step of determining includes determining said bandwidth requirements for the file when the file is initially stored.

5. An apparatus for providing files to a remote node comprising:

means for determining whether bandwidth is available for transmitting across a communications link a file requested by a remote node;

means for reserving said bandwidth for the requested file if said bandwidth is determined to be available; and means for opening the requested file for transmission only if said bandwidth is reserved.

6. The apparatus of claim 5 further comprising means for notifying the remote node that said bandwidth is determined not to be available for transmitting the file.

7. The apparatus of claim 5 further comprising means for determining bandwidth requirements for transmitting the file.

8. The apparatus of claim 7 wherein said means for determining includes means for determining bandwidth requirements for the file when the file is initially stored.

9. A computer program product stored on a computer readable medium for providing files to a remote node comprising:

computer readable program code means for determining whether bandwidth is available for transmitting across a communications link a file requested by a remote node;

computer readable program code means for reserving said bandwidth for the requested file if said bandwidth is determined to be available; and computer readable program code means for opening the requested file for transmission only if said bandwidth is reserved.

10. The computer program product of claim 9 further comprising computer readable program code means for notifying the remote node that said bandwidth is determined not to be available for transmitting the file.

11. The computer program product of claim 9 further comprising computer readable program code means for determining bandwidth requirements for transmitting the file.

12. The computer program product of claim 11 wherein said computer readable program code means for determining includes means for determining bandwidth requirements for the file when the file is initially stored.

13. A data processing system for providing files to a remote node comprising:

storage means for storing files to be processed and transmitted;

processing means for processing said stored files;

means for determining whether bandwidth is available for transmitting across a communications link a file stored in memory and requested by a remote node;

means for reserving said bandwidth for the requested file if said bandwidth is determined to be available; and means for opening the requested file for transmission only if said bandwidth is reserved.

14. The data processing system of claim 13 further comprising means for notifying the remote node that said bandwidth is determined not to be available for transmitting the file.

15. The data processing system of claim 13 further comprising means for determining bandwidth requirements for transmitting the file.

16. The data processing system of claim 15 wherein said means for determining includes means for determining bandwidth requirements for the file when the file is initially received for storage on said memory means.

* * * * *